United States Patent
Saraby (10) Patent No.: US 7,707,031 B2
(45) Date of Patent: Apr. 27, 2010

(54) LARGE SCALE MEASUREMENT OF SUBJECTIVE QUALITY IN MOBILE COMMUNICATIONS SYSTEMS

(75) Inventor: David Saraby, Danderyd (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1213 days.

(21) Appl. No.: 11/224,307

(22) Filed: Sep. 13, 2005

(65) Prior Publication Data

US 2006/0199548 A1 Sep. 7, 2006

Related U.S. Application Data

(60) Provisional application No. 60/656,903, filed on Mar. 1, 2005, provisional application No. 60/664,192, filed on Mar. 23, 2005.

(51) Int. Cl.
*G10L 21/00* (2006.01)
(52) U.S. Cl. .................................................. 704/228
(58) Field of Classification Search ................ 704/228
See application file for complete search history.

(56) References Cited

U.S. PATENT DOCUMENTS

| | | | |
|---|---|---|---|
| 5,742,929 A | 4/1998 | Källman et al. | |
| 5,867,813 A * | 2/1999 | Di Pietro et al. | 704/202 |
| 6,389,111 B1 * | 5/2002 | Hollier et al. | 379/28 |
| 6,668,160 B2 * | 12/2003 | Schmitt et al. | 455/67.14 |
| 6,985,559 B2 * | 1/2006 | Hardy | 379/1.02 |
| 7,130,273 B2 * | 10/2006 | Baj | 370/242 |
| 7,173,910 B2 * | 2/2007 | Goodman | 370/252 |
| 7,280,487 B2 * | 10/2007 | Goodman | 370/252 |
| 7,388,946 B1 * | 6/2008 | Mussman et al. | 379/15.01 |
| 2004/0176040 A1 | 9/2004 | Thornton et al. | |
| 2005/0064820 A1 | 3/2005 | Park et al. | |

FOREIGN PATENT DOCUMENTS

WO WO 96/17454 6/1996

OTHER PUBLICATIONS

Translation of Russian Official Action, Nov. 23, 2009, in corresponding Russian Application No. 2007136041.

* cited by examiner

*Primary Examiner*—Talivaldis Ivars Smits
(74) *Attorney, Agent, or Firm*—Nixon & Vanderhye P.C.

(57) ABSTRACT

Large scale subjective signal quality measurements for a mobile radio communications system are made using a large number of handheld subscriber radio communication units moving at various positions in the mobile radio communications system. Each handheld subscriber unit stores a copy of a test voice or video signal stream as does a quality management network node. An uplink subjective signal quality for each such handheld subscriber unit is determined based on a comparison of the stored test signal and the received test signal from the handheld subscriber unit. A downlink subjective signal quality to each handheld unit is based on the returned test signal stream received from the handheld subscriber unit and the stored test signal stream. Because the handheld units do not perform the subjective quality comparison calculations, ordinary subscriber units that do not require significant extra data processing resources associated with those calculations may be used.

22 Claims, 5 Drawing Sheets

LARGE SCALE MEASUREMENT OF SUBJECTIVE QUALITY IN MOBILE COMMUNICATIONS SYSTEMS

CROSS-REFERENCE TO PROVISIONAL APPLICATIONS

This application claims priority from commonly-assigned U.S. patent provisional applications with Ser. Nos. 60/656,903, entitled "Measuring Statistical Voice Quality in Mobile Systems in Large Scale," filed on Mar. 1, 2005, and 60/664,192, also entitled, "Measuring Statistical Voice/Video Quality in Mobile Systems in Large Scale," filed on Mar. 23, 2005, the contents of which are incorporated here by reference.

TECHNICAL FIELD

The technical field is wireless communications. The present invention relates to gathering measurement data to determine the subjective quality of service provided in a mobile radio communications system, which can be used to improve service and/or optimize performance or capacity in the mobile radio communications system.

BACKGROUND AND SUMMARY

In mobile radio communications system, the quality of service provided to subscribers is very important. What is important in voice and video services is the perception by a human being of the quality of a voice message or a video message. One way to measure that quality is to conduct subjective tests involving various human beings. But the results could be individually subjective, and the tests are expensive and unsuitable for large scale quality monitoring.

There are several algorithms developed to measure the "subjective" speech quality of a transmitted voice file. One example is the Perceptual Evaluation of Speech Quality (PESQ) algorithm defined in ITU-T P.862. The subjective quality is not measured based upon conventional radio channel quality measurement methods such as signal-to-voice ratio (SIR), a bit error rate (BER), frame error rate (FER), or signal strength. Rather, PESQ and similar algorithms predict the results of subjective listening tests. To measure speech quality, PESQ uses a sensory model to compare an original, unprocessed, untransmitted speech signal with a degraded version of that known speech signal at the output of the communications system, e.g., the signal received by a radio receiver after having been distorted by a radio channel. Comparing the reference and degraded speech signals provides subjective quality score.

Subjective quality measurement algorithms, like PESQ, are resource intensive requiring large amounts of data processing calculations and considerable memory resources. This large data processing load is further exacerbated if quality measurements and calculations are made frequently or even continuously. Accordingly, mobile test units (MTUs) include substantial data processing hardware and software necessary to calculate and store measurement data associated with subjective quality determination algorithms like the PESQ algorithm. Video quality measurement algorithms are presumably even more resource demanding. These MTU vehicles collect measurement data under realistic conditions with respect to the existing radio conditions at various locations in the mobile radio communications system.

But these MTUs are very costly, heavy, and consume considerable amounts of power, making them unsuitable for a large-scale measurement where quality measurements are taken frequently from a large number of measurement units. While it might be feasible in a commercial setting to employ several MTUs, it would be much more desirable to make the measurements on a much larger scale, perhaps, on the order of hundreds, thousands, or tens of thousands of measurement units. In the future, there may be a need to include Quality Measurement Functionality in every commercial user equipment so that an operator may start and stop the measurements based on time, location, or type of problem. But this large scale is costly, not only in terms of the large number of expensive MTUs, but also in terms of the human resources required to locate and/or operate those MTUs.

The present invention overcomes these obstacles and achieves these and other desirable goals. Large scale subjective signal quality measurements for a mobile radio communications system are obtained using a large number of handheld subscriber radio communication units located at various positions in the mobile radio communications system. Each handheld subscriber unit stores a copy of a test voice, other audio, or video signal stream, as does a quality management network node. An uplink subjective signal quality for each handheld subscriber unit is determined at the network node based on a comparison of the stored test signal and a received test signal transmitted from the handheld subscriber unit. A downlink subjective signal quality to each handheld unit is determined at the network node based on the stored test signal and a test signal stream originally transmitted to the handheld subscriber unit and then returned by the handheld subscriber unit to the network node. Because the handheld units do not perform the demanding subjective signal quality comparison calculations, ordinary handheld subscriber units can be used.

The quality management network node stores multiple uplink quality values and downlink subjective quality values associated with each handheld subscriber unit from which an overall subjective quality associated with each handheld subscriber unit is determined. A location or area in the mobile radio communications system and/or a particular time frame may also be determined for various subjective quality measurements. In one example embodiment, the test signal stream is a voice signal, and the quality associated with each handheld subscriber unit is determined using a Perceptual Evaluation of Speech Quality (PESQ) algorithm. The test stream could also be video or other audio analyzed by other suitable subjective quality determination algorithms.

A database stores a signal quality measurement, a time associated with the subjective signal quality measurement, and a geographic position associated with the subjective signal quality measurement. A network operator provides subjective service quality information associated with various time(s) and location(s) in the mobile radio communications system based on information stored in that database.

In an alternative example embodiment, a handheld subscriber unit receives a test voice, other audio, or video signal, converts that signal into a test data stream, and returns the test data stream to the quality management network node. The quality management node determines a downlink signal quality to the handheld subscriber unit based on the comparison of the stored test signal and the returned test data signal received from the handheld subscriber unit.

In another example embodiment, the speed of handheld subscriber units is taken into an account in the subjective quality determination. A handheld subscriber unit sends its current position and speed of movement to the quality management network node. The quality management network node and the handheld subscriber unit divide the predetermined test signal into portions. The portion size is based on the position and/or speed of the handheld subscriber unit. The quality management network node and the handheld subscriber unit send the test signal stream in multiple portions rather than as one signal stream. Thus, when the handheld subscriber unit returns received portions of the test signal stream to the quality management network node, the network node reassembles the test signal stream from those returned portions. In this or any embodiment, echo cancellation of the returned predetermined test signal is preferably prevented.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using a non-limiting example where the service provided and being measured is voice service, the present invention is not limited to voice service and may be employed to measure the subjective quality of any type of radio communications service including but not limited to video, other audio, or other similar service with high processing and storage capacity on the server side and lower performance and storage needs on the other side.

In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
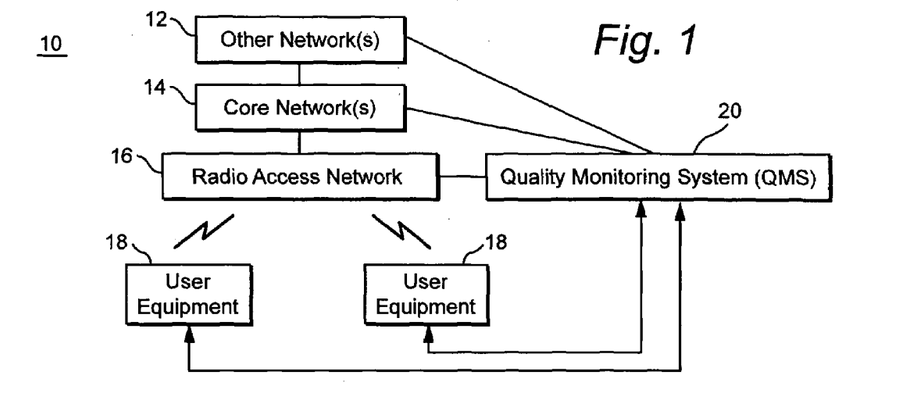
FIG. 1 is a high level function block diagram of a mobile radio communications system.

FIG. 1 illustrates an example mobile radio communications system 10. Multiple User Equipments (UEs) communicate over a wireless interface with a Radio Access Network (RAN) 16. Any kind of radio access technology such as FDMA, TDMA, CDMA, GSM, WCDMA, etc. may be employed. The Radio Access Network is coupled to one or more core networks 14. Example core networks include a circuit-switched network such as a Mobile Switching Center (MSC) and a packet-switched network such as a GPRS node.

A core network 14 is coupled to one or more other networks 12, such as the internet, an ISDN, a PSTN, etc. The Radio Access Network may be coupled directly to a quality monitoring system (QMS) 20. QMS 20 may also be coupled (or instead be coupled) to one or more of the core networks 14 and/or one or more of the other networks 12. A User Equipment (UE) includes but is not limited to a subscriber terminal, a mobile terminal, a mobile phone, a cell phone, a mobile station, a wireless terminal, etc.

Figure 2:
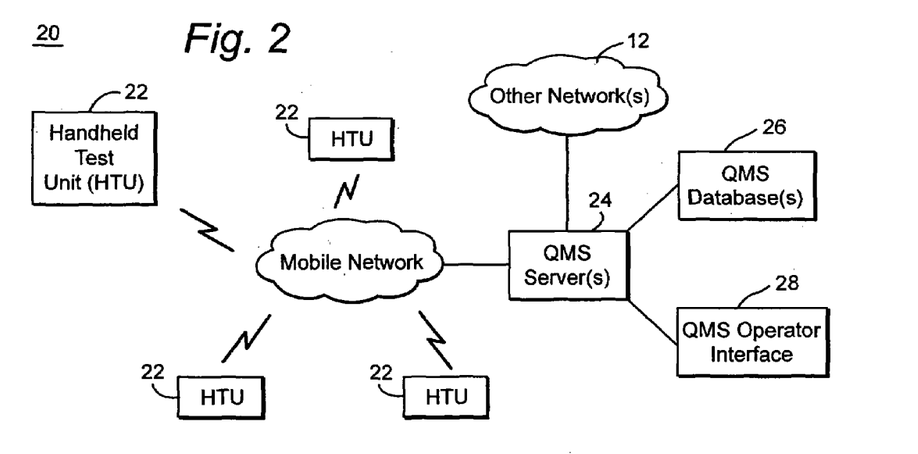
FIG. 2 is a function block diagram of a mobile radio communications system incorporating a quality management system.

FIG. 2 illustrates a mobile communications system 20 in accordance with a non-limiting example embodiment for performing quality measurement. The mobile network communicates over a wireless interface with a large number of handheld test units (HTUs) 22. The handheld test units correspond to conventional user equipment, like ordinary cell phones and the like, that have been slightly modified as described below. The modifications do not require any substantial increase in data processing calculations or data storage. Preferably, the handheld units correspond to a large number of these subscriber terminals already being serviced by the mobile network. The mobile network is coupled to one or more Quality Monitoring System (QMS) server(s) 24. The QMS server(s) 24 is coupled to one or more QMS databases 26 and a QMS operator interface 28. The QMS server(s) 24 may also be coupled to one or more other networks 12.

Figure 3:
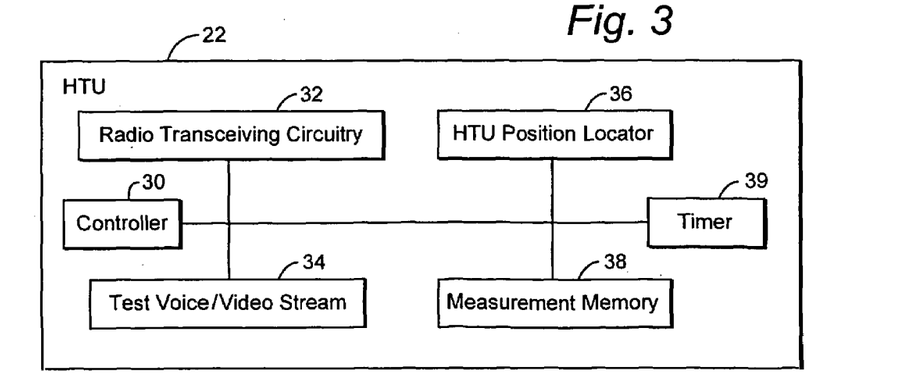
FIG. 3 is a function block diagram of a handheld subscriber test unit.

FIG. 3 illustrates in function block form an example of a handheld test unit (HTU) 22, and in a preferred example, is a typical mobile user/subscriber communications device, e.g., a UE. A supervisory controller 30 is coupled to radio transceiving circuitry 32, a memory that stores a test voice/video stream 34, an HTU position locator 36, a measurement memory 38, and a timer or real time clock 39. The radio transceiving circuitry 32 includes conventional radio communications and baseband signal processing. The test voice/video stream 34 may be a known or predetermined stream of speech, sounds, or video preferably (but not necessarily) particularly designed for test purposes in order to test subjective quality of a received signal. The test stream could be a recorded voice sentence or recorded video clip simulating a normal voice or video call, respectively.

The HTU position locator 36 determines a current geographic location of the HTU 22. For example, the position locator 36 could be a commercially available Global Positioning System (GPS) receiver/processor. Alternatively, the HTU position locator 36 may determine the location of the HTU 22 using triangulation in conjunction with signals from multiple base stations in the radio access network 16. Of course, other techniques may be used to determine the HTU position. Although a timer 39 is shown for providing a time value associated with a subjective quality measurement event in the HTU 22, timing information may be obtained from external sources such as base stations, the GPS system, etc. The measurement memory 38 is used to store the geographical route of a moving HTU, the received voice or video stream, and radio parameters that determine the radio environment at each point along the route.

Figure 4:
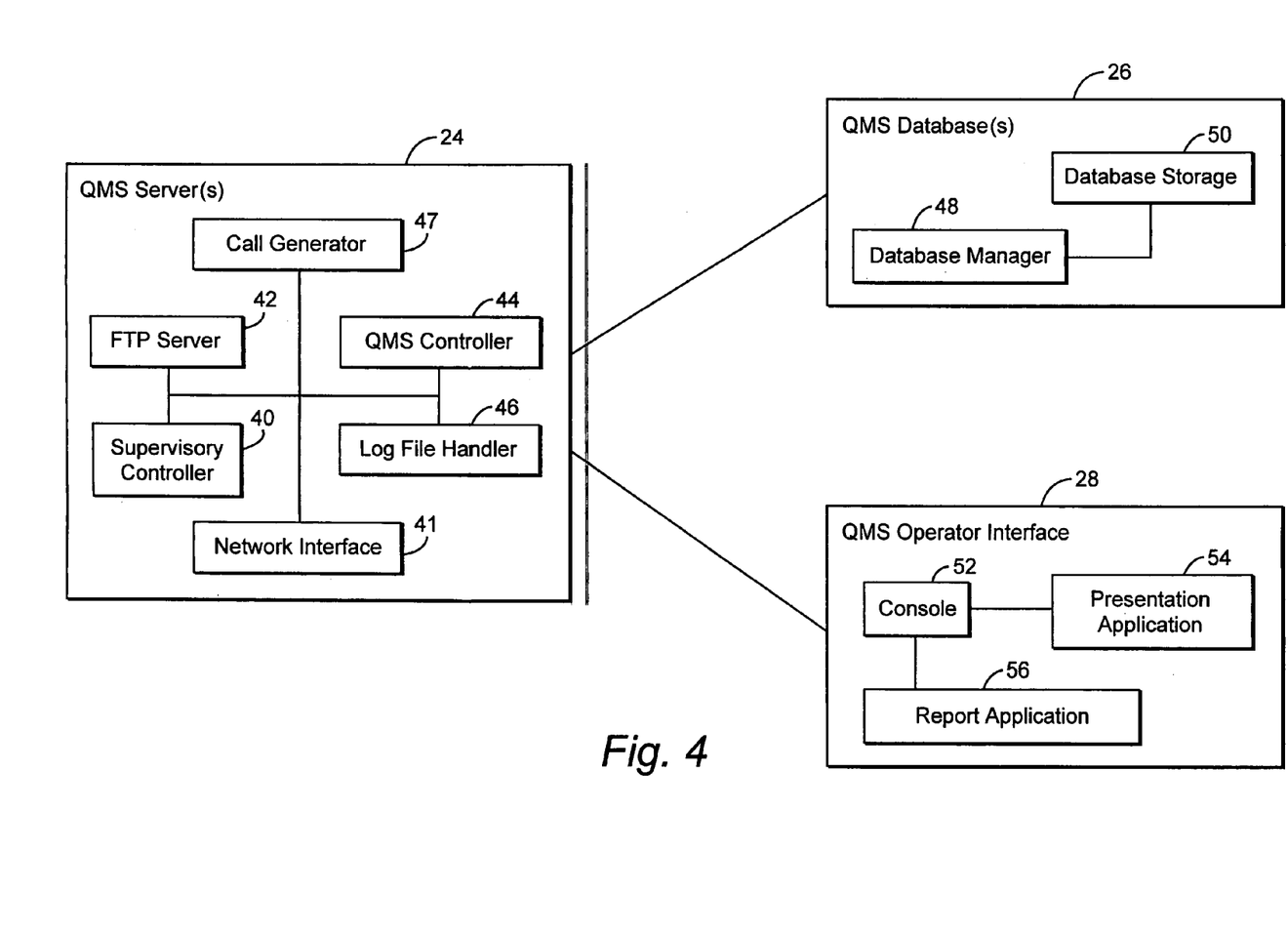
FIG. 4 is a function block diagram illustrating an example implementation that employs one or more quality monitoring system (QMS) servers, QMS databases, and QMS operator interfaces.

FIG. 4 shows an example of a function block diagram of one or more QMS server(s) 24 coupled to one or more QMS databases 26 and a QMS operator interface 28. Other configurations may be employed. It is assumed for purposes of the following explanation that one QMS server 24 and one QMS database 26 are employed. But depending on the size of the mobile communication system being monitored and evaluated, a cluster of servers and/or databases (with load sharing mechanisms) may be appropriate.

The QMS server 24 may include a file transfer protocol (FTP) server 42. The QMS FTP server 42 may be used (1) to send work orders to the HTUs that specify what, how, where, and/or when to measure, and (2) to receive log files from the HTU 22 including the HTU measurements and the position and/or timing of those measurements. In one non-limiting example embodiment described below, a downlink test signal stream received by an HTU may be digitized and stored in a log file sent to the QMS FTP server 42. Also, information regarding various HTU events such as handovers, dropped calls, blocked calls, etc. may be included in the log file.

The QMS server 24 also may include a call generator 47 which makes voice or video calls to or receives calls from HTUs on voice or video lines. Pre-recorded test voice or video streams are then sent to the other end through these call generator set-up call connections in order to measure the impact of the call connection on quality. The QMS server 34 also includes a supervisory controller 40 for controlling the overall operation of the QMS server 34, and a QMS controller 44 that is responsible for determining the uplink and downlink subjective signal quality value based on the information received from the QMS call generator 47 and various HTUs 22 as will be described in more detail below. For example, the QMS controller 44 may execute the ITU standard PESQ subjective quality measurement algorithm for voice or other audio, and a similar type subjective quality evaluation algorithm for video may be used. Other subjective quality measurement algorithms may be used.

The log file handler 46 converts received air interface measurements and organizes those measurements into a database format. The formatted data is then provided by the log file handler to the QMS database 26 where the database manager 48 stores that information into database storage 50. The log file handler 46 also generates mobile system events as described above. The UE event information and radio environment measurements aid an operator, for example, in understanding reasons why a certain low quality condition exists. In the non-limiting example third embodiment (described below) where the downlink test signal stream received by an HTU is stored as a data file in a log file, the log file handler 46 converts the signal in the log file back into the HTU-detected test signal stream and sends it to the QMS controller 44 for analysis.

The network interface 41 permits the QMS server 24 to communicate with one or more of the radio access network 16, core network 14, and/or other network 12. The QMS operator interface 28 includes a console 52 supported by a presentation software application 54 and report application software 56. The presentation application displays subjective quality measurement data collected by the HTUs, for example on a map or grid, spreadsheets, line charts, etc. The statistics taken from the measurement data by the presentation application may be stored in a statistics database. Those statistics can be used to identify trends in the subjective signal quality measurements over a particular time span or to identify signal quality problem areas based on large amounts of processed data. The reporting application 56 is used to create reports based on the processed data.

Figure 5:
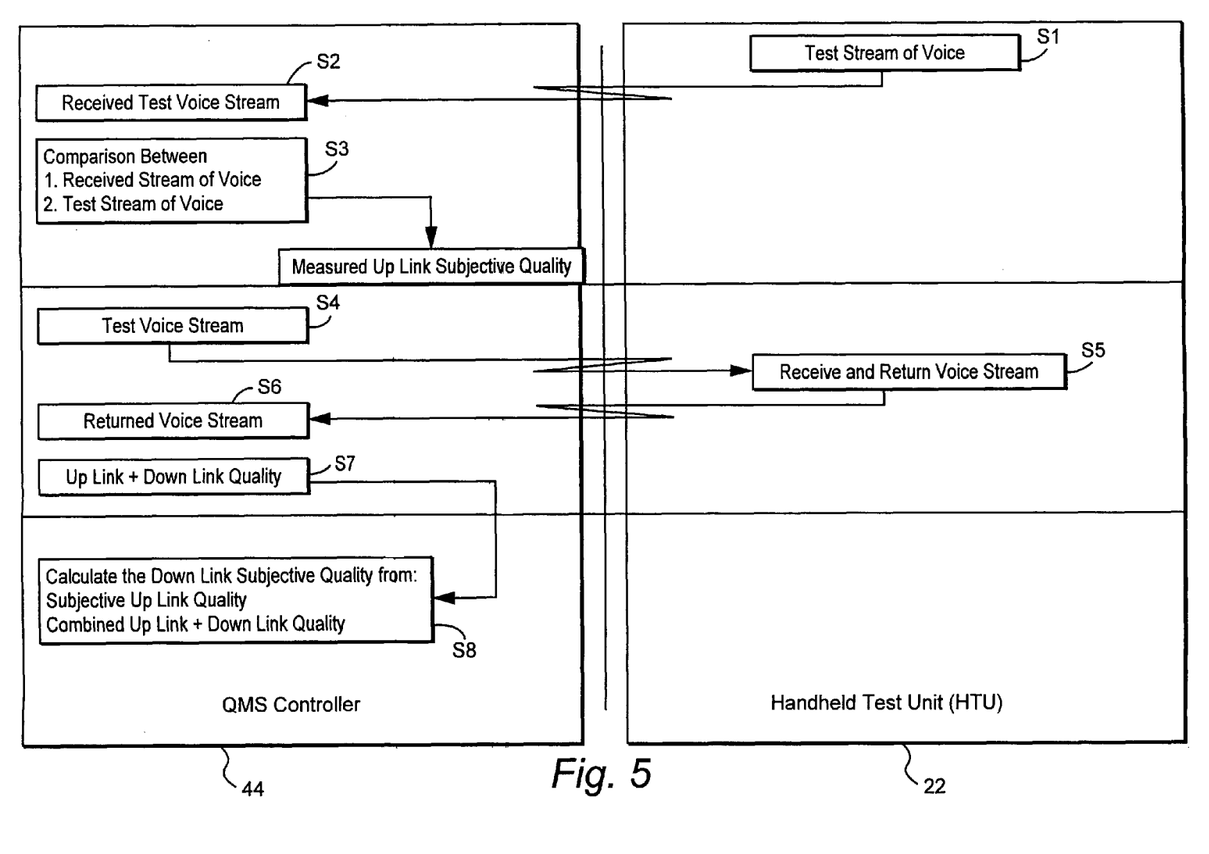
FIG. 5 illustrates a signaling exchange between a QMS controller and a handheld test unit in accordance with an example embodiment.

The subjective signal quality determination process in accordance with one non-limiting, example embodiment is now described in conjunction with FIG. 5. FIG. 5 illustrates example tasks and associated transmission between the QMS server 24 and a handheld test unit (HTU) 22. Initially, the HTU 22 stores a pre-recorded test voice/video signal stream. The term "voice" here includes any natural voice, music, or other desired audio signals. For simplicity, the example is described in terms of voice, but these procedures equally apply for video or other types of communications media the quality of which can be subjectively evaluated by a human being. The HTU 22 transmits the test voice stream over the wireless interface to the radio access network (step S1) where it is directed to the QMS controller 44 via the QMS call generator 47 (step S2). The QMS controller 44 executes a subjective voice quality determination algorithm, such as PESQ, to subjectively a compare the received voice stream and the original test stream stored at the QMS server 24 (step S3). The algorithm result is a subjective measurement of the subjective uplink quality which is then formatted by the log file handler 46 and stored in the database storage 50 under the control of the database manager 48.

The pre-recorded test voice stream stored in the QMS server 24 is sent by the QMS call generator 47 to the handheld test unit 22 in the same way as a normal voice call or video session with a user (HTU) would be and over the wireless interface (step S4). The handheld test unit 22 receives the test voice stream, which has been distorted by transmission over the wireless interface. Rather than the handheld unit 22 performing a complex subjective quality determination algorithm (like a PESQ algorithm) the HTU simply returns the received voice stream back to the QMS controller 44 in the uplink direction (step S5). The QMS controller 44 receives the returned voice stream (step S6) which includes the effects of transmission over both the uplink and downlink (step S7). The QMS controller 44 then calculates (1) the downlink subjective quality from the subjective uplink signal quality determined in step S3 and (2) the combined uplink and downlink subjective quality obtained from step S8.

In the first non-limiting example embodiment, the QMS controller 44 removes the subjective uplink quality from the combined uplink and downlink subjective quality values to obtain the downlink measurement values. Because the down link signal quality is calculated from the combined uplink and downlink signal quality, the uplink signal quality should be satisfactory.

Thus, the procedure outlined in FIG. 5 permits the QMS server to perform the intensive data processing operations and storage required to make many subjective signal quality determinations using an algorithm like the ITU's PESQ. Although not shown in FIG. 5, the handheld test unit also provides the QMS controller 44 with a time-stamped location that can be associated with each subjective signal quality measurement. The QMS controller 44 then provides, via log file handler 46, the calculated uplink and downlink signal quality associated with an HTU at a particular time and at a particular location in the mobile radio communications system. The QMS database 50 stores uplink and downlink subjective signal quality values with corresponding position and time information for as many as handheld test units as desired. The number of handheld test units may range in the thousands, tens of thousands, or more. The frequency of the subjective signal quality determinations is controlled by the QMS operator. Because the intensive data processing operations are performed in the QMS server 24 and not in the HTUs, increased complexity and/or increased calculation frequency can be handled by adding resources to the QMS server 24 rather than having to add resources to hundreds, thousands, or even more handheld test units.

Figure 6:
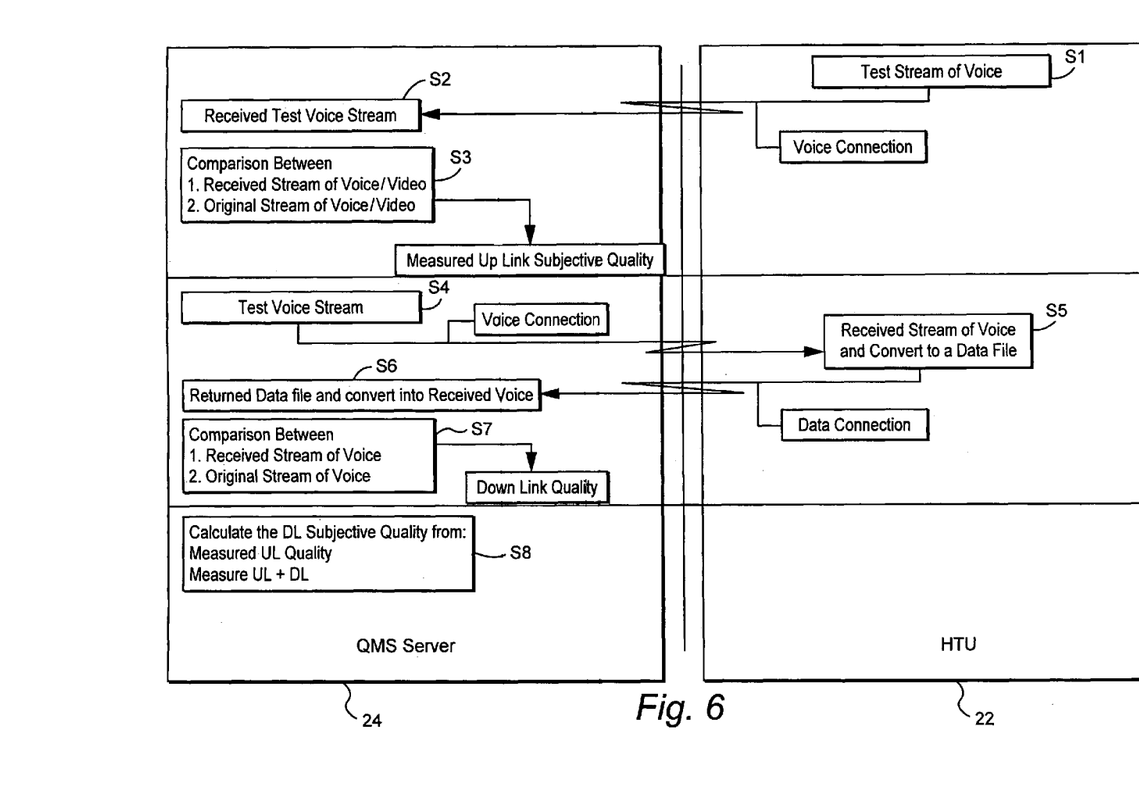
FIG. 6 illustrates a signaling exchange between a QMS controller and a handheld test unit in accordance with another example embodiment.

FIG. 6 illustrates a second non-limiting example embodiment that compensates for a moving HTU. This embodiment accounts for a moving HTU which might affect the accuracy of the subjective quality determination if the entire test stream of voice were provided in a single data "package." To compensate for HTU movement, this second non-limiting embodiment divides the test voice stream into smaller portions depending on the speed of the HTU 22. Specifically, the HTU 22 determines its position using the HTU position locator 36 and determines its speed using the speed position. That speed determines the size of the portion or sample of the test voice stream to be used. For example, a faster speed might warrant a smaller portion size. The HTU 22 provides its speed, and possibly the size of the portion, to the QMS controller 44. Alternatively, the HTU 22 may simply provide its speed to the QMS controller 44, and the QMS controller 44 determines the appropriate sample size/portion. Then, the HTU 22 sends out portions of the test voice stream to the QMS controller 44. The QMS controller 44 receives each portion of the test voice stream and assembles them together until the entire test stream has been reconstructed. Once reconstructed, the comparison described in FIG. 5 in step 3 is performed to determine the measured uplink subjective quality.

When the QMS controller 44 sends the test voice stream downlink in step S4 in FIG. 5, it sends out only portions of that test stream to the HTU 22. The HTU 22 then receives and returns the portions of the voice stream that it has received in step S5 back to the QMS controller 44. The QMS controller 44 assembles these returned test stream portions and then makes the calculations for the downlink subjective quality in Step S8 of FIG. 5. In this way, the impact of the HTU's movement, particularly at fast speeds, is accounted for. If the whole stream is recorded before transmission on the uplink channel, then the environment where the downlink stream was recorded would be different from the one transmitting the uplink stream. Chopping will help in the way that the upload stream and download stream environment will be almost the same. Although the size of the test signal portion depends on a number of factors, a greater HTU speed will generally benefit from a smaller portion size.

There may be a problem with existing echo cancellation employed in the radio access network 16 when the HTU 22 returns a voice test stream or returns voice test stream portions received downlink from the radio network. In other words, an echo canceller in one of the base stations in the radio network near the HTU may try to cancel the returned voice stream or voice stream portion depending on how close in time the returned signal is received relative to the time when the base station actually transmitted the signal to the HTU. To avoid such undesired echo cancellation, different approaches may be used. One example approach is to insert some sufficient time delay before the HTU can return the voice stream/portion over the wireless interface. Another example approach would be to reshuffle the different test signal portions that are out of order before returning them to the QMS controller. This would also avoid echo cancellation at the base station because the echo canceller would likely not detect reshuffled portions as echo.

A third, non-limiting, example embodiment is now described in conjunction with FIG. 6. This embodiment is particularly advantageous when the uplink channel quality is less than may be desired. In the embodiments above, the HTUs return the received voice stream from the QMS controller 44 as a data file. If the uplink radio channel conditions are poor, the distorted returned signal adversely impacts the QMS controller's ability to accurately remove the uplink signal quality information from the returned combined signal in order extract downlink subjective signal quality. Thus, the QMS controller 44 monitors the uplink radio conditions using traditional radio channel quality measures such as signal-to-interference ratio (SIR), received signal strength (RSSI), bit error rate (BER), frame error rate (FER), etc.

If the uplink radio channel conditions are not satisfactory, based on some evaluation parameter(s), the QMS controller 44 may signal to one or more HTUs involved in the downlink subjective signal quality measurement steps to convert the received test stream into a corresponding data file (step S5) and return that data file back to the QMS controller 44 over the wireless interface, e.g., as part of a log file. As illustrated in FIG. 6, the test voice stream is normally sent over a voice connection, i.e., a connection set up to carry voice, as illustrated between steps S1 and S2 and between steps S4 and S5. Thus, steps S1-S4 are the same as those described for FIG. 5. But at step S5, the received test signal stream is converted into data packets and stored as a data file. In step S6, the data file is sent over a data connection, i.e., a connection set up to carry data rather than voice as part of the HTU's log file. The data file is more immune to poor radio conditions because it can encoded with redundant bits and error-detected and/or error-corrected in the radio access network before it is sent onto the QMS controller. The FTP server 42 converts the data file back into the voice stream that was actually received at the HTU and sends the voice stream to the QMS controller 44 for use in determining subjective downlink quality (step S6). By sending the received test signal as a data file, the impact of the poor radio conditions in the uplink direction is avoided so that the QMS controller 44 can accurately remove the uplink subjective quality from the combined returned signal to permit more accurate calculation of the downlink subjective quality using in steps S7 and S8 procedures like those described in FIG. 5.

Figure 7:
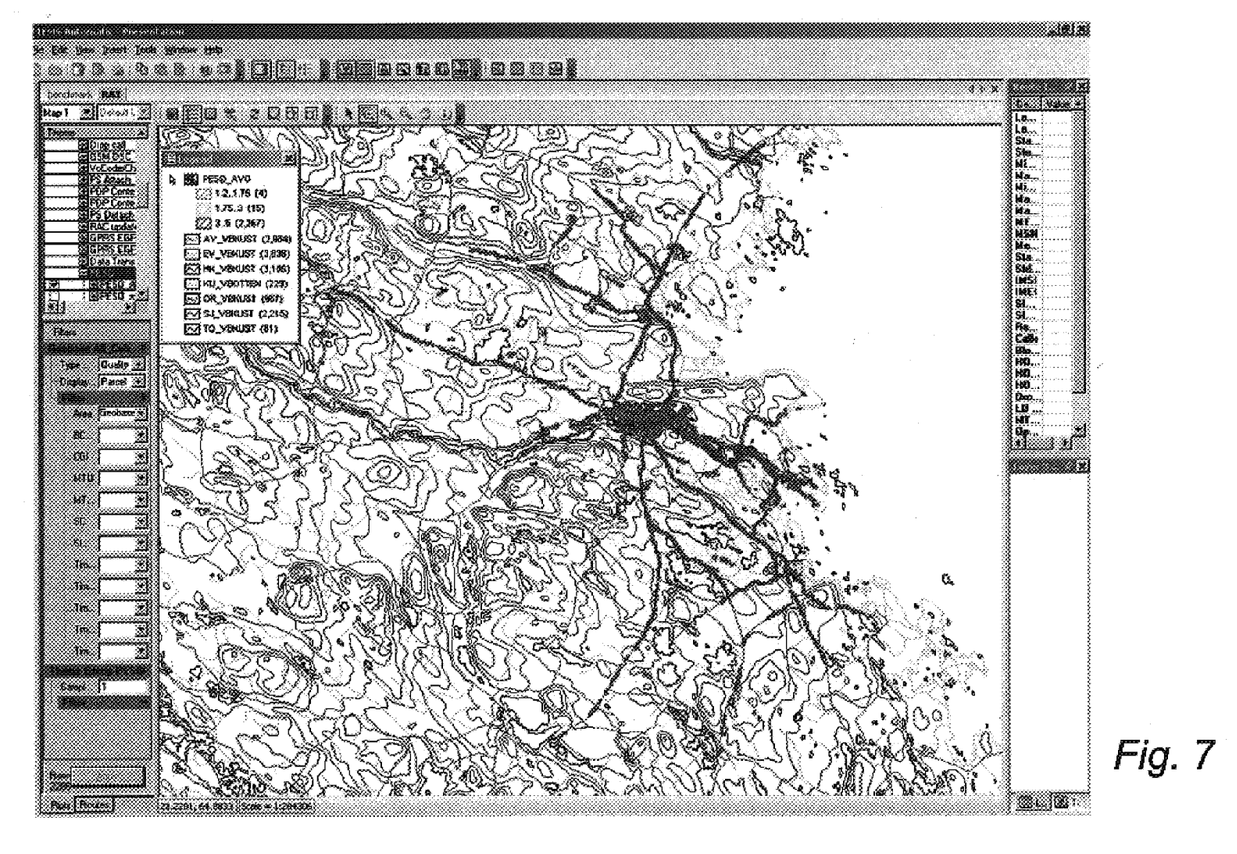
FIG. 7 illustrates an example of a signal quality display that may be provided to an operator based on the signal quality.

After performing a large number of measurements, the results stored in the QMS database storage 50 may be processed by the presentation application 54 and/or report application 56 to provide an operator with useful information to manage the quality in the mobile communications system. The subjective quality information provided by a large number of HTUs is preferably associated in the database 50 with both a geographical location in the mobile radio communications system and at particular time(s). A map display, like that shown in FIG. 7, may be generated at the operator console 52 by the presentation application 54. In the PESQ algorithm, the perceived voice quality can have MOS values from 1 to 6, where 1 stands for unacceptable quality and 6 for excellent quality. Colors are associated with these values, such as Red for 1, Brown for 2, Yellow for 3, Blue for 5, and Green for 6. The dotted points along various mobile station driving route are colored according to the above scheme. Statistical trends and performance can be reviewed and optimization procedures based on these statistics and statistical trends may be implemented. For example, the large amount of statistical data relating to subjective signal quality can be used to identify locations with poor coverage or times such as rush hour. The operator may respond by increasing signal strength at identified times or locations, by adding additional base stations, etc.

In preferred embodiments, the QMS is an independent computer system. That is, the QMS operates independently from the infrastructure of the wireless service provider's wireless network, thereby eliminating the need for costly changes to the infrastructure of the wireless server provider's wireless network, and the need for extensive compatibility testing to have the system perform the additional functions described above. This reduces implementation and maintenance costs. It also allows for easier integration of the QMS into existing wireless networks. But the QMS functionality could be implemented in one or more existing networks, if desired.

The present invention can be realized in hardware, software, or a combination of hardware and software and can be realized in a centralized fashion in one computer system, or in a distributed fashion where different elements are spread across several interconnected computer systems. Any kind of computer system—or other apparatus adapted for carrying out the methods described herein—may be used. A typical combination of hardware and software could be a general purpose computer system with a computer program that, when being loaded and executed, controls the computer system such that it carries out the methods described herein.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 U.S.C. §112 unless the words "means for" are used.

The invention claimed is:

1. A method for obtaining large scale subjective signal quality measurements for a mobile radio communications system including a large number of handheld subscriber radio communication units located at various positions in the mobile radio communications system and providing subscribers with wireless communications service, at least a group of the handheld subscriber units storing a copy of a test voice or video signal stream, and a quality management network node storing a copy of the test signal stream communicating with the handheld subscriber units via a radio access network, comprising:

each group handheld subscriber unit transmitting over a wireless interface to the quality management network node the test signal stream;

each group handheld subscriber unit receiving over the wireless interface the test signal stream sent by the quality management network node and returning the received test signal stream back to the quality management network node, and the quality management network node determining an uplink subjective signal quality for each group handheld subscriber unit based on a comparison of the stored test signal stream and the received test signal stream from the group handheld subscriber unit, the quality management network node determining a downlink subjective signal quality to each group handheld radio unit based on the stored test signal stream and the returned test signal stream received from the handheld subscriber unit.

2. The method in claim 1, wherein the quality management network node stores multiple uplink subjective signal quality values and downlink subjective signal quality values associated with each group handheld subscriber unit from which overall subjective signal quality values are determined for various locations in the mobile radio communications system.

3. The method in claim 1, wherein the test signal stream is a voice signal and wherein subjective signal quality associated is determined using a perceptual evaluation of speech quality (PESQ) algorithm.

4. The method in claim 1, wherein each group handheld subscriber unit stores a time and a geographic position each time the handheld subscriber unit sends the test signal stream.

5. The method in claim 1, further comprising:

storing in a database for each group handheld subscriber unit a subjective signal quality measurement, a time associated with the subjective signal quality measurement, and a geographic position associated with the subjective signal quality measurement.

6. The method in claim 5, further comprising:

providing an operator with signal quality information associated with various times and locations in the mobile radio communications system based on information stored in the database.

7. The method in claim 1, wherein a group handheld subscriber unit receives the test signal stream, converts the received test signal stream into a data file, and returns the data file to the quality management network node, wherein the quality management network node converts the returned data file back into the received test signal stream received at the handheld subscriber unit and determines a downlink subjective signal quality to the handheld subscriber unit based on a comparison of the stored voice signal or video signal and the converted data file received from the handheld subscriber unit.

8. The method in claim 1, wherein each group handheld subscriber unit sends its current position and speed of movement to the quality management network node, and wherein the quality management network node and each group handheld subscriber unit divide the test signal stream into portions, the portion size being based on the position or speed of the handheld subscriber unit, and sends the test signal stream in multiple portions rather than as one signal stream, and wherein each group handheld subscriber unit returns received portions of the test signal stream back to the quality management network node and the quality management network node reassembles the test signal stream using returned portions.

9. The system in claim 1, further comprising:

preventing echo cancellation of the returned test signal stream.

10. The method in claim 1, wherein the quality management network mode removes the stored test signal stream from the returned test signal stream and compares the remaining signal with the stored test signal stream to determine the downlink subjective signal quality.

11. A handheld subscriber radio communication unit for use in measuring a subjective quality of service provided by a mobile radio communications system, comprising:

radio transceiving circuitry for transmitting signals over a wireless interface;

a memory for storing a known voice or video stream;

a processor for:

determining a location of the handheld subscriber unit and an associated time;

sending location and time information to a quality management server via the radio transceiving circuitry along with the stored known voice or video stream;

returning the known voice or video stream actually received from the quality management server via the radio transceiving circuitry to permit the quality management server processor to determine an uplink subjective voice or video quality associated with the location, time, and the known voice or video stream sent by the handheld subscriber unit based on a comparison of the known version of the voice or video stream and the sent known voice or video stream from the handheld subscriber unit and to determine a downlink subjective voice or video quality associated with the sent location and time and the known voice or video stream returned by the handheld subscriber unit based on a comparison of the known version of the voice or video stream and the sent known voice or video stream from the handheld subscriber unit.

12. The handheld subscriber unit in claim 11, further comprising:
   a position locator for determining a current location of the handheld subscriber unit.

13. The handheld subscriber unit in claim 11, wherein the processor is configured to divide the known voice or video stream into portions, the size of which is based on the position or speed of the handheld subscriber unit, and send the stored known voice or video stream in multiple portions rather than as one signal stream, and
   wherein the processor is configured to return received portions from the known voice or video stream received from the quality management server back to the quality management server.

14. The handheld subscriber unit in claim 11, wherein the processor is configured to convert the received test signal stream into a data file and return the data file to the quality management server.

15. A quality management node for use in measuring a subjective quality of service provided by a mobile radio communications system, comprising:
   an interface for interfacing communications with multiple subscriber handheld radio communication units;
   a memory for storing a known version of a voice or video stream and a subjective signal quality information; and
   a controller, coupled to the interface and memory, for:
      determining a location of each handheld subscriber unit;
      receiving from each handheld subscriber unit a transmitted version of the known voice or video stream;
      determining an uplink subjective quality associated with each handheld subscriber unit based on a comparison of the transmitted version of the known voice or video stream and the stored known version of the voice or video stream;
      sending the known version of the voice or video stream to each of the handheld subscriber units;
      receiving from each of the handheld subscriber units a returned version of the known voice or video stream;
      determining a downlink subjective quality associated with each handheld subscriber unit based on the sent version of the known voice or video stream, and the returned version of the known voice or video stream.

16. The quality management node in claim 15, wherein the controller is configured to store multiple uplink subjective quality values and downlink subjective quality values associated with each handheld subscriber unit from which an overall subjective quality associated with each handheld subscriber unit is determined for a location or area in the mobile radio communications system for a particular time frame.

17. The quality management node in claim 15, wherein the controller is configured to determine subjective quality using a perceptual evaluation of speech quality (PESQ) algorithm.

18. The quality management node in claim 15, wherein the controller is configured to receive from each handheld subscriber unit a time and a geographic position each time the handheld subscriber unit sends the known version of the voice or video stream, the quality management node further comprising:
   a database for storing for each handheld subscriber unit a subjective signal quality measurement, a time associated with the subjective signal quality measurement, and a geographic position associated with the subjective signal quality measurement.

19. The quality management node in claim 18, further comprising:
   an operator interface for providing an operator with subjective service quality information for multiple locations and times in the mobile radio communications system based on information stored in the database.

20. The quality management node in claim 15, wherein the controller is configured to receive from each handheld subscriber unit a data file corresponding to the voice or video signal the handheld unit received from the quality management node and convert the date file back into the voice or video stream received by the handheld unit,
   wherein the quality management network node is configured to determine a downlink subjective signal quality to each handheld radio unit based on the stored version of the voice or video stream and the converted voice or video stream.

21. The quality management node in claim 15, wherein the controller is configured to receive from each handheld subscriber unit a current position and speed of movement of the handheld subscriber unit, and
   wherein the controller is configured to divide the known version of the voice or video stream into portions, the size of which is based on the position or speed of the handheld subscriber unit, and send the known version of the voice or video stream in multiple portions rather than as one signal stream, and
   wherein the controller is configured to receive from each handheld subscriber unit returned portions of the voice or video stream received at the handheld unit and to reassemble the voice or video stream using received portions.

22. The quality management node in claim 15, wherein the controller is configured to remove the stored version of the voice or video stream from the returned version of the known voice or video stream and to compare the remaining voice or video stream with the stored version of the voice or video stream.

* * * * *